Oct. 19, 1943.  H. W. PRICE ET AL  2,332,341
GEAR SHIFTING MECHANISM
Original Filed Feb. 2, 1939   2 Sheets—Sheet 1
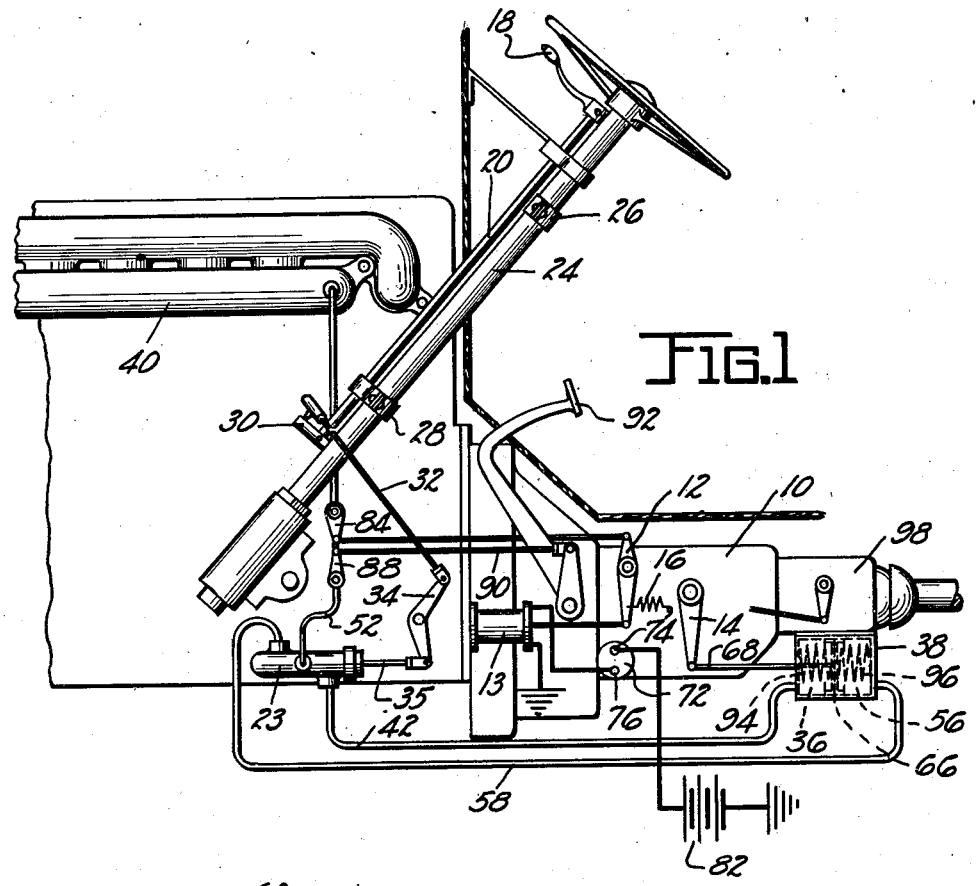
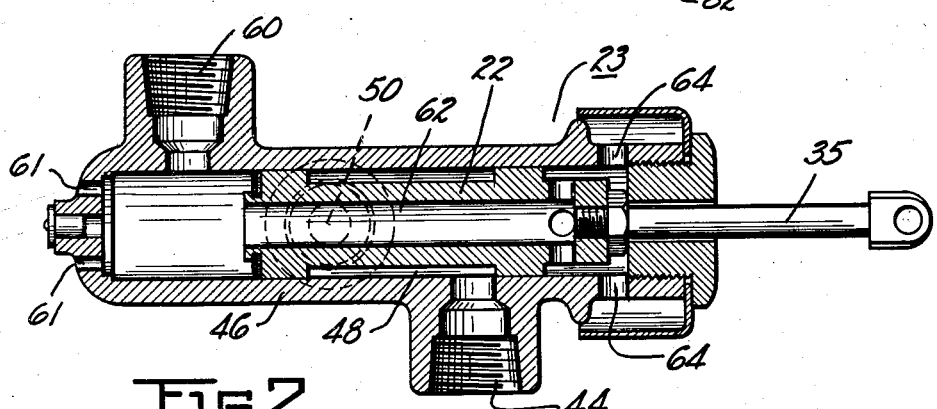
INVENTOR
HAROLD W. PRICE
WALTER L. KRIEG
BY H. O. Clayton
ATTORNEY Oct. 19, 1943. H. W. PRICE ET AL 2,332,341
GEAR SHIFTING MECHANISM
Original Filed Feb. 2, 1939 2 Sheets-Sheet 2
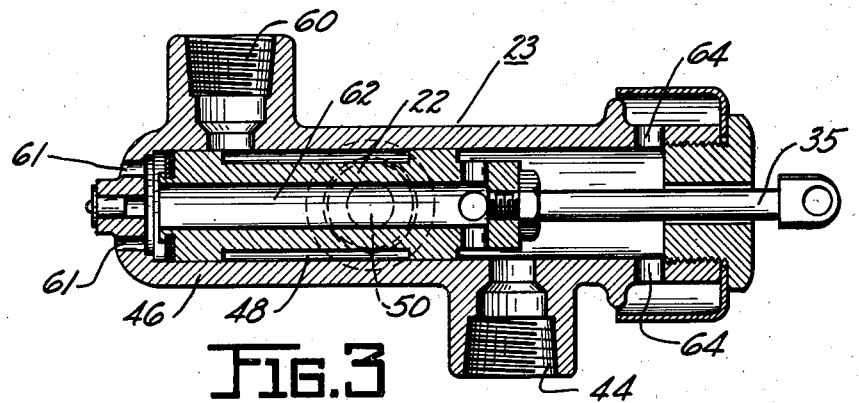
FIG.3
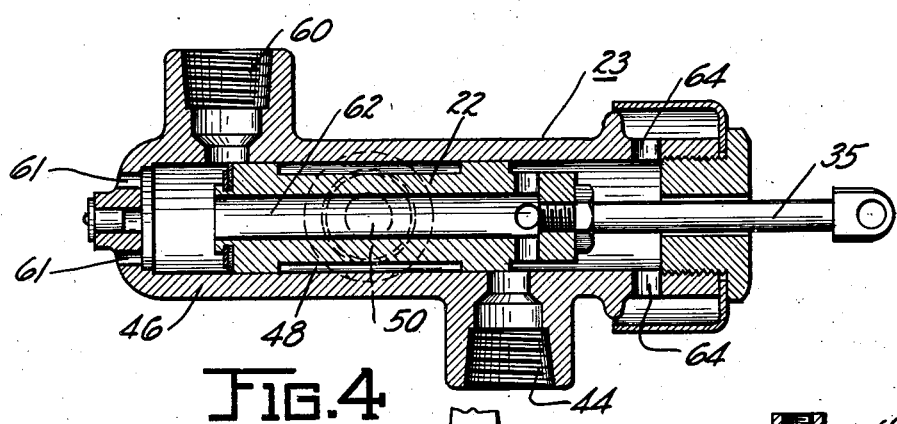
FIG.4
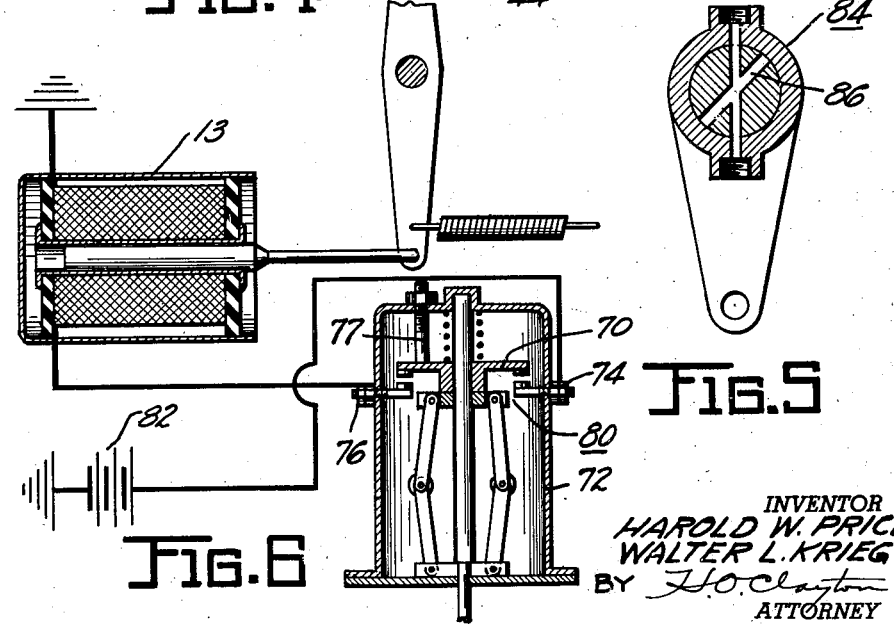
FIG.5
FIG.6
INVENTOR
HAROLD W. PRICE
WALTER L. KRIEG
BY H. O. Clayton
ATTORNEY Patented Oct. 19, 1943

2,332,341

UNITED STATES PATENT OFFICE 2,332,341

GEAR SHIFTING MECHANISM

Harold W. Price and Walter L. Krieg, South Bend, Ind., assignors to Bendix Aviation Corporation, South Bend, Ind., a corporation of Delaware Original application February 2, 1939, Serial No. 254,135. Divided and this application October 12, 1940, Serial No. 360,908

3 Claims. (Cl. 74—335)

This invention relates to transmission operating means and particularly to means for operating the three-speeds forward and reverse transmission of an automotive vehicle, said transmission including the usual sliding gears, mechanism which is operated to select a gear to be actuated and other mechanism operative to actuate the selected gear to complete the operation of the transmission.

One of the objections to the mechanism for operating the three-speeds forward and reverse transmission of the day is the length of movement required of the gear shift lever, or, if the movement is small, the relatively large force required to move said lever. It is also to be noted that the present-day gear shift lever constitutes an obstruction in the driver's compartment and prevents complete freedom of movement of the driver and the other occupants.

The principal object of the invention is to provide an easily controlled transmission operating mechanism including automatically operable power means for actuating the aforementioned gear selecting mechanism, said means cooperating with means, preferably power means, for actuating the selected rail.

Yet another object of the invention is to provide power means for selecting one or the other of the shift rails of a three-speeds forward and reverse transmission, said means including means automatically operable, when and only when the vehicle is in motion, to effect a selection of the second and high gear shift rail.

Our invention further contemplates the provision of selector means, positioned within easy reach of the driver, for controlling power means for actuating mechanism to establish the transmission in gear, said means being so interlocked with means for actuating a shift rail selector mechanism that the operation of the power means to establish the transmission in gear may not be completed until after the shift rail selector mechanism has completed its work.

Yet another object of the invention is to provide, in a transmission having mechanism for selecting a sliding gear to be actuated and mechanism for actuating the selected gear, means for operating the transmission, the control of said means being in large measure effected by a lever member mounted within easy reach of the driver and operable in but one plane. In a preferred embodiment of our invention, a selector is angularly movable in a plane parallel to the steering wheel and is mounted immediately beneath the wheel on the steering post of the vehicle.

Other objects of the invention and desirable details of construction and combinations of parts will become apparent from the following detailed description of certain embodiments of the invention, taken in conjunction with the accompanying drawings illustrating said embodiments, in which:

Figure 1 discloses, in side elevation, the transmission operating mechanism constituting our invention;

Figure 2 is a sectional view of the four-way valve for controlling the shift rail operating motor disclosed in Figure 1;

Figure 3 is a view, similar to Figure 2, disclosing the four-way valve in another operative position;

Figure 4 is a view, similar to Figures 2 and 3, disclosing the four-way valve in its transmission neutral position;

Figure 5 is a sectional view of the motor operated cut-off valve disclosed in Figure 1; and Figure 6 is a view disclosing, in detail, the shift rail selecting power means disclosed in Figure 1.

Referring to Figure 1 of the drawings, a three-speeds forward and reverse transmission 10 is operated by interlocked power means, the parts being constructed and arranged to provide power means for operating the means, not shown, for selecting one or another of the sliding gears of the transmission 10 and to provide other power means for operating the selected gear to thus establish the transmission in gear. The transmission, including the means for selecting the sliding gear to be operated and the means for operating the selected gear, is not disclosed in detail, inasmuch as no claim is made thereto. Most of the selective types of sliding gear transmissions of the day include so-called shift rails operatively connected to the aforementioned slidable gears; however, our invention is not limited to such a transmission. In the description which follows, the mechanism constituting our invention is described as operating a three-speeds forward and reverse transmission having a so-called high and second gear shift rail and a low and reverse gear shift rail.

Describing now the operation of both power means and the construction and arrangement of the parts thereof, there are provided a crank 12, constituting one element of the rail selector mechanism, and a crank 14, constituting one of the elements of the mechanism for actuating the selected rail. A spring 16 constitutes a power means and serves to bias the crank 12 to the full-line position disclosed in Figure 1, in which position the first and reverse shift rail of the transmission is selected for subsequent operation. When the vehicle is in motion, the crank 12 is automatically rotated, by a solenoid motor 13, to the dotted-line position disclosed in Figure 1, in which position the shift rail selecting mechanism has been operated to select the second and high gear shift rail. The motor 13 and its operation will be described in detail hereinafter.

After starting the engine and disengaging the clutch, the driver usually places the transmission in low gear. To accomplish this result with the mechanism of our invention a selector 18, secured to one end of a tube 20, is rotated clockwise to draw a spool-shaped valve member 22 of a control valve 23 to the right to the position disclosed in Figure 2. The tube 20 extends parallel with the steering column 24 of the vehicle and is secured thereto by brackets 26 and 28. The valve member 22 is connected with the selector by means of a crank 30 secured to one end of the tube 20, a link 32, a bell crank 34 and a link 35. With the valve member 22 in the position disclosed in Figure 2, a chamber 36 of a double-ended air-suspended motor 38 is connected to the intake manifold 40 of the engine via a conduit 42, a port 44 in a valve casing 46, housing the valve member 22, a recess 48 in said member, a port 50 in the valve casing and a conduit 52.

With the engine idling, the throttle being closed, preparatory to placing the transmission in low gear and starting the vehicle, there is induced, by virtue of the pumping action of the pistons of the engine, a partial vacuum in the intake manifold. It follows therefore, with the chamber 36 of the motor connected to the manifold as just described, that said chamber will be partially evacuated.

Referring again to the valve mechanism 23, which may be defined as a four-way valve, with the valve member 22 in the position disclosed in Figure 2, a chamber 56 of the motor 38 is vented to the atmosphere via a conduit 58, a port 60 in the valve casing 46, the interior of the casing, ports 61 in said casing, duct 62 within the valve member 22 and ports 64 in the casing 46. With the chamber 36 partially evacuated and the chamber 56 vented to the atmosphere, a piston 66 or power element of the motor 38 is subjected to a differential of pressures. The piston is therefore subjected to a force resulting in a movement of the same to the left to rotate the crank 14 clockwise and to move the low and reverse shift rail to establish the transmission in low gear. The piston 66 is connected to the crank 14 by a connecting rod 68.

The low and reverse shift rail is operated, for it will be remembered that when the vehicle is at a standstill the solenoid motor 13 is deenergized and the spring 16 functions to operate the shift rail selecting mechanism to select the aforementioned rail.

After reengaging the clutch and accelerating the vehicle to the desired speed, it is the usual practice to place the transmission in second gear, whereupon the accelerator is released, the clutch is again disengaged and the selector 18 is rotated in a counterclockwise direction. This operation results in moving the valve member 22 to the left to the position disclosed in Figure 3. The chamber 36 of the motor 38 is then vented to the atmosphere via ports 64 and 44 in the valve 23 and the conduit 42, and the chamber 56 is connected to the intake manifold via conduit 58, port 60, recess 48, port 50 and conduit 52. The piston 66 is then subject to a differential of pressures resulting in its movement to the right to rotate the crank 14 in a counterclockwise direction. When the crank 14 has moved sufficiently to return the low and reverse shift rail to its transmission neutral position, there comes into play the aforementioned automatically operable solenoid motor 13, which, together with the spring 16, constitutes power means for selecting one or the other of the shift rails of the transmission.

Describing the structure and operation of this mechanism, which is disclosed in Figure 6, when the vehicle is in motion, a contact block 70, operated by a propeller shaft operated fly-ball governor 72, engages contacts 74 and 76 to energize the solenoid motor 13. If desired, the governor mechanism may be set, say by an adjusting screw 77, so that the solenoid 13 is energized when the vehicle is moving at a certain very low speed: and, under ordinary operation, this setting will, of course, prevent placing the transmission in reverse when the vehicle is in motion. The contacts 74 and 76 together provide a control unit or switch 80, and the electrical circuit, including the solenoid motor and switch, is completed by a battery 82 and the wiring interconnecting the solenoid, switch and battery. When the solenoid is energized, which, of course, usually occurs before the transmission is placed in neutral, a load is placed upon the crank 12 to rotate the same clockwise. Accordingly, when the low and reverse shift rail reaches its transmission neutral position, the selector mechanism of the transmission will be automatically operated to effect a selection of the second and high gear shift rail. This operation is insured to a degre by the operation of a cut-off valve 84 which disconnects the fluid transmitting connection between the intake manifold and the control valve 23 as the crank 16 is rotating. When the crank 12 is in either of its extreme positions, that is, in position to select one or the other of the shift rails, the valve member 84, Figure 5, is positioned to interconnect one or the other of conduits 42 and 58 with the ports 44 and 60, and accordingly with the two portions of the conduit 52. In any other position of the crank 12, that is, any position in which the rail selecting mechanism has not completed its work, the valve member is so positioned that no portions of the conduits 42 and 58 registered with the ports 44 and 60. Accordingly, the motor 38 may not be energized to operate the shift rails, unless and until one or the other of the rails has been selected for operation.

Continuing the description of the operation of the mechanism to place the transmission in second gear, after and only after the rail selector mechanism has been operated sufficiently to make possible an actuation of the second and high gear shift rail, the motor 38 may be again energized to establish the transmission in second gear; for then the duct 86 of the valve member 84 functions to complete the connection between the manifold and the valve 23 and the differential of pressures acting upon the piston 66 effects a movement of the same to the right to again place the rod 68 in tension to rotate the crank 14 counterclockwise and to place the transmission in second gear. In other words, in changing the transmission setting from low gear to second gear, the motor 38 is momentarily deenergized, or rather its energization is not maintained, when the valve member 84 is being rotated from one extreme position to the other, that is, when the shift rail selecting mechanism is functioning.

Having described the operation of placing the transmission in low gear and second gear, it is believed unnecessary to describe in detail the operation of placing the transmission in high gear. Suffice it to say that the selector 18 is rotated clockwise to again move the valve member 22 to the position disclosed in Figure 2. The accelerator being released to provide a source of vacuum, the motor 38 is again energized, moving the piston 66 clockwise, to establish the transmission in high gear. It is assumed, of course, that in effecting the shift from second gear to high gear the speed of the vehicle does not drop below that necessary to effect a closing of the switch 80, for if such deceleration occurred the solenoid 13 would be deenergized and, when the second and high gear shift rail reached its transmission neutral position, the spring 16 would function to operate the crank 12 to effect a selection of the low and reverse shift rail. The motor 38 would then effect a movement of this rail to again establish the transmission in low gear.

There are other features of our invention which have not been described in detail, such, for example, as a two-way cut-out valve 88, Figure 1, operated by a link 90 secured to the clutch pedal 92. With such a valve, the manifold is cut off from the control valve 23 when the clutch is engaged. Accordingly, it is possible to energize the motor 38 to move the shift rails only when the clutch is disengaged.

As another feature of our invention, springs 94 and 96 are placed in the motor 38 to bias the piston 66 to its transmission neutral position. Accordingly, when the selector 18 is moved to its transmission neutral position, that is, half-way between its extreme positions previously referred to, the valve member 22 is moved to the position disclosed in Figure 4, both of chambers 36 and 56 of the motor 38 being then vented to the atmosphere. This operation permits one or the other of the springs 94 and 96 to move the piston 66 and its connected shift rail to their transmission neutral positions.

After the clutch is engaged and the two-way cut-off valve 88 has been operated, the remaining air in the partially evacuated chamber of the motor 38 is trapped to thus maintain the motor energized to hold the transmission in gear, despite the load from one or the other of the springs 94 and 96. The detent or shift rail locking mechanism of the transmission and the load upon the meshed gear teeth, when the engine is driving the propeller shaft or the propeller shaft is driving the engine, of course aid the motor 38 in retaining the shift rail in its gear established position, so long as the selector 18 is in either of its gear setting positions.

With the mechanism of our invention, one or the other of the springs 94 and 96 will function to neutralize the transmission only when the valve 23 is moved to its transmission neutral position to vent the chambers 36 and 56 to atmosphere and the driving load is taken off the transmission gears, e. g., when the vehicle is brought to a stop or the clutch is disengaged.

In order to place the transmission in reverse gear, the vehicle is brought to a stop, to prevent an energization of the solenoid 13, and the selector 18 is rotated in a counter-clockwise direction, to move the valve member 22 to the position disclosed in Figure 3. The motor 38 is accordingly energized to move the low and reverse shift rail and thereby establish the transmission in reverse gear.

There is thus provided a power means, including spring 16 and solenoid 13, for automatically operating the shift rail selector mechanism of the transmission. This power means and the valve 84 operated thereby so cooperate with the power means for actuating the selected shift rail as to make possible a quick operation of the transmission into either low gear or reverse gear, when the vehicle is at a standstill, and, when the vehicle is in motion, the transmission may be quickly established either in second gear or in high gear, depending upon the position of the selector 18. With the selector in its transmission neutral position and the vehicle at a standstill the transmission may only be established in either low or reverse gear.

One of the outstanding features of our invention lies in the simplicity of operation of the selector 18, the same being moved in but one plane to one or the other of but two positions to place the transmission in gear. To neutralize the transmission, the selector is moved to its transmission neutral position, thus permitting one or the other of the springs 94 and 96 to function.

With the mechanism described, including the cut-off valve 84, it is necessary to disengage the clutch pedal 92 to make an operation of the transmission possible. Accordingly, there is provided what is known in this art as a preselective gear shifting mechanism, for, with the vehicle in motion, the selector 18 may be moved to select either high or second gear before the clutch is disengaged. With the vehicle at a standstill and with an operation of the selector 18, either low gear or reverse gear may be selected prior to a disengagement of the clutch. A free-wheeling unit 98 may also be incorporated in the propeller shaft to thus facilitate an operation of the transmission with the vehicle in motion, particularly a vehicle having a transmission which does not include a so-called synchromesh mechanism. The equivalent of a free-wheeling unit may be had with the provision of a clutch, not shown, operated by the clutch pedal and placed somewhere in the power transmission line to the rear of the change-speed transmission. The governor 72 is of course connected to the propeller shaft to the rear of the free-wheeling unit 98 to make possible an operation of the governor to control the transmission operating mechanism.

The above described invention is disclosed in our application, Serial No. 254,135, filed February 2, 1939, this application constituting a division thereof.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. In a motor vehicle provided with a change-speed transmission, said transmission comprising a plurality of shift rails, means including a crank extending from the casing of the transmission for selecting a rail to be operated, means for operating the selected rail to establish the transmission in gear, automatically operable power means for actuating the crank of the rail selector means, power means for actuating the second mentioned means to thereby move the selected shift rail and establish the transmission in gear, and a cut-off valve actuated by the crank for, in part, controlling the operation of said second-mentioned power means.

2. In an automotive vehicle provided with a transmission having a plurality of sliding gears, means including a crank extending from the transmission casing, for selecting one of said gears to be actuated, means for actuating the selected gear to thereby establish the transmission in the desired gear ratio, automatically operated power means, operable when and only when the vehicle is in motion for actuating the crank of the first-mentioned means, other power means for actuating the second-mentioned means including a pressure differential operated motor, a valve for controlling the operation of said motor and means for actuating said valve including a selector mounted within easy reach of the driver of the vehicle, and valve means, actuated by said crank and operative only when said first mentioned power means is operating, for momentarily rendering the aforementioned pressure differential operated motor inoperative.

3. In an automotive vehicle provided with a change-speed transmission having a low and reverse gear shift rail and a second and high gear shift rail, means for selecting one or the other of said rails including a crank and means for moving the selected rail including another crank, means, including a hand operated selector movable in but one plane, for rotating the second mentioned crank and thereby moving the rail selected for operation, automatically operated means for actuating the crank of the rail selecting means, said rail selecting and rail moving means serving, when the transmission is in neutral and the vehicle is at a standstill, to so operate the rail selecting means as to effect a selection of the low and reverse shift rail and further serving, when the transmission is in neutral and the vehicle is in motion, to so actuate said first mentioned crank as to effect a selection of the second and high shift rail.

HAROLD W. PRICE.
WALTER L. KRIEG.